United States Patent [19]

Shung

[11] Patent Number: 4,924,494
[45] Date of Patent: May 8, 1990

[54] FAX MACHINE EQUIPPED FOR SIMULTANEOUS TRANSMISSION AND RECEPTION VIA TWO TELEPHONE LINES

[75] Inventor: Kevin Shung, Taipei, Taiwan

[73] Assignee: Copam Electronics Corp., Taipei, Taiwan

[21] Appl. No.: 347,667

[22] Filed: May 5, 1989

[51] Int. Cl.$^5$ ...................... H04M 1/21; H04M 11/00
[52] U.S. Cl. ......................................... 379/100; 379/93
[58] Field of Search ................... 379/100, 96, 97, 98, 379/93; 358/468

[56] References Cited

U.S. PATENT DOCUMENTS

| | | | |
|---|---|---|---|
| 4,578,796 | 3/1986 | Charalambous et al. | 379/98 |
| 4,593,323 | 6/1986 | Kanda et al. | 379/100 |
| 4,754,335 | 6/1988 | Izawa et al. | 379/100 |

Primary Examiner—Jin F. Ng
Assistant Examiner—Stella L. Lee
Attorney, Agent, or Firm—Bacon & Thomas

[57] ABSTRACT

A fax machine equipped for simultaneous transmission and reception via two telephone lines. The fax machine is provided with a master processor, a slave processor and a command buffer, in which the master processor is communicated with a first remote fax machine and the slave processor is communicated with a second remote fax machine via respective telephone lines. The command buffer is interposed between the master and slave processors to provide a transmission channel for the command signals. An image buffer is connected to the master processor via a first switch, and is connected to the slave processor via a second switch to store image data at the request of the master processor when transmitting the image data to the second remote fax machine and to store image data at the request of the slave processor when receiving the image data from the second remote fax machine.

2 Claims, 6 Drawing Sheets

FAX MACHINE EQUIPPED FOR SIMULTANEOUS TRANSMISSION AND RECEPTION VIA TWO TELEPHONE LINES

BACKGROUND OF THE INVENTION

The present invention relates to a fax machine connected to two telephone lines, wherein two processors are provided in association with two respective telephone interface adapters, and a command buffer is electrically interposed between the processors and transmits command signals therebetween. More particularly, the present invention relates to a fax machine which can simultaneously transmit and receive fax image data via the two telephone lines.

As is well-known, a conventional fax machine has a single processor electrically connected with a scanner and a printer for transmitting or receiving fax image data via a telephone line. As the popularity of fax machines has increased, so has the frequency of use. It is not uncommon now to see an office or company employing several fax machines and dedicating several telephone lines to fax image data.

Although with advances in technology, fax machines are no longer extremely expensive, the total cost of owning several machines does add up. Furthermore, the valuable office space is taken up by several machines. Therefore, a fax machine, such as we are proposing, which can literally take the place of two fax machines would be very desirable, from both the standpoint of convenience and also from the standpoint of cost effectiveness.

It is the purpose of the present invention, therefore, to provide such a fax machine which can simultaneously communicate with two remote fax machines, regardless of whether it is in the process of transmitting or receiving.

SUMMARY OF THE INVENTION

A primary objective of the present invention is to provide a fax machine connected to two telephone lines, wherein two processors are provided in association with two respective telephone interface adapters and the two telephone lines to enable the fax machine to simultaneously communicate with two remote fax machines, and in which a command buffer is electrically interposed between the processors to provide a transmission channel for command signals to be transmitted therebetween.

Another objective of the present invention is to provide a fax machine connected to two telephone lines, in which simultaneous communication with two remote fax machines for the transmission of fax image data is possible.

Further objectives and advantages of the present invention will become apparent as the following description proceeds, and the features of novelty which characterize the invention will be pointed out with particularity in the claims annexed to and forming a part of this invention.

DETAILED DESCRIPTION OF THE PREFERRED EMBODIMENT

Figure 1:
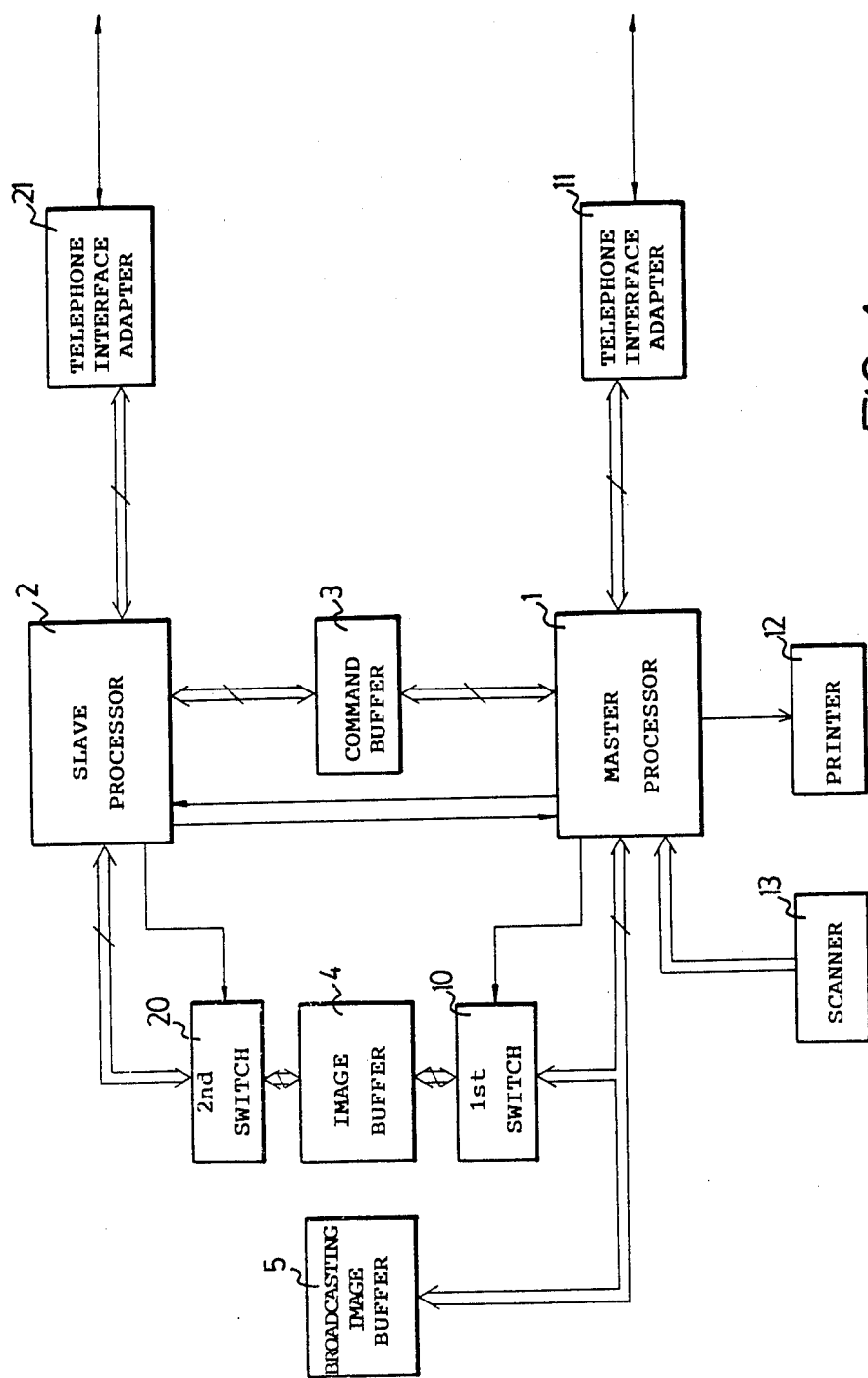
FIG. 1 is a block diagram representation of a fax machine in accordance with the present invention.

With reference to the drawings and in particular to FIG. 1 thereof, it can be seen that a fax machine in accordance with the present invention substantially comprises a master processor 1, a slave processor 2 and a command buffer 3. The command buffer 3 is electrically interposed between the master and slave processors 1 and 2, and provides a transmission channel for command signals therebetween.

As is common in a conventional fax machine, the master processor 1 is electrically connected to a telephone interface adapter 11 and a telephone line for communicating with a first remote fax machine, and further electrically connected to a printer 12 and a scanner 13. The printer 12 serves as the output peripheral of the fax machine for printing image data which is received from the first remote fax machine. The scanner 13 serves as the input peripheral of the fax machine for scanning image data to transmit the scanned image data to the first remote fax machine. Since the technology and construction of the master processor 1, telephone interface adapter 11, printer 12 and scanner 13 are well-known in the art, further discussion and description are not considered necessary at this time.

In a manner similar to the master processor 1, the slave processor 2 is connected to a second telephone interface adapter 21 and a second telephone line for communicating with a second remote fax machine. The receipt or transmission of the fax image data on the slave processor 2 should be acknowledged and controlled by the master processor 1. An image buffer 4 is connected to the master processor 1 via a first control switch 10 and to the slave processor 2 via a second control switch 20 to store the image data at the request of the master processor 1 when transmitting the image data to the second remote fax machine and to store the image data at the request of the slave processor 2 when receiving the image data from the second remote fax machine.

When the slave processor 2 is communicated with the second remote fax machine for the receipt of the fax image data, the slave processor 2 sends a Receiving-Start-Command to the master processor 1. Then, the master processor 1 switches off the first control switch 10 and sends an ACK signal to the slave processor 2. After receiving the ACK signal from the master processor 1, the slave processor 2 switches on the second control switch 20 and stores the image data into the image buffer 4. After the slave processor 2 finishes receiving the fax image data and stores it in the image buffer 4, the slave processor 2 sends a Receiving-Finish-Command to the master processor 1 and switches off the second control switch 20. After receiving the Receiving-Finish-Command from the slave processor 2, the master processor 1 switches on the first control switch 10 and activates the printer 12 to output the image data from the image buffer 4. It should be appreciated that the above-mentioned Command signals are transmitted through the command buffer 3. Likewise, the transmission procedure for transmitting the image data to the second remote fax machine is similar to the above-mentioned receipt procedure.

In addition to the image buffer 4, a broadcasting image buffer 5, connected to the master processor 1, is provided to store the image data to be broadcasted in order to facilitate the transmission of the fax image data without re-scanning the fax image data.

Figure 2:
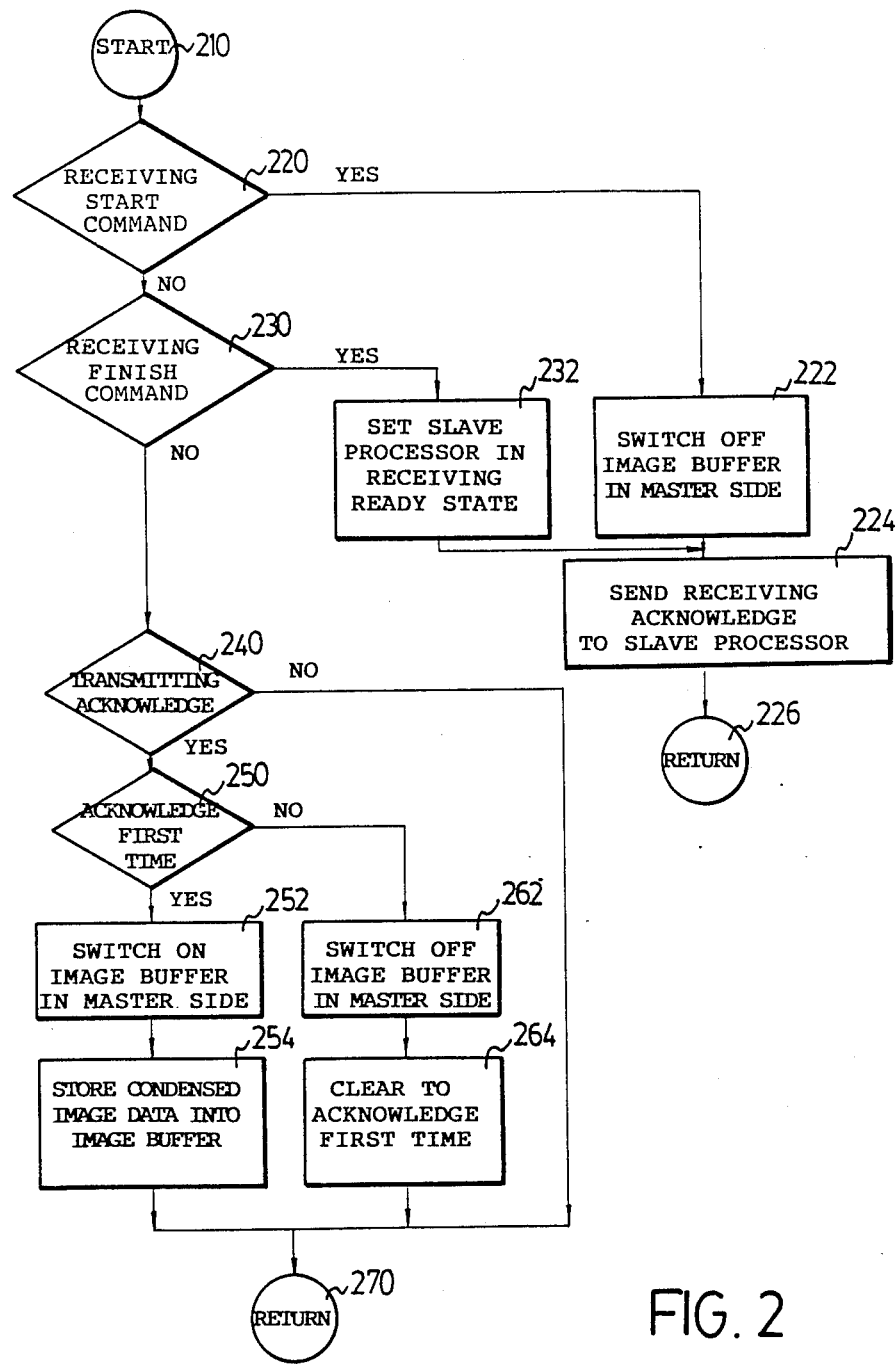
FIG. 2 is a flow chart illustrating the interrupt routine of the master processor in the fax machine of FIG. 1.

It will be appreciated by those skilled in the art that the implementation of an interrupt routine is required in the master processor 1 to ensure that the slave processor 2 is actuated to receive or transmit fax image data appropriately. A flow chart for such an interrupt routine is shown in FIG. 2. The interrupt routine is initialized in step 210. In step 220, the master processor 1 checks whether or not a received signal (s2) sent from the slave processor 2 is Receiving-Start-Command. If the slave processor 2 sends the Receiving-Start-Command, the master processor 1 switches off the first control switch 10 in step 222, and thus sends an ACK signal to the slave processor 2 in step 224. Therefore, the master processor 1 is disconnected from the image buffer 4 and the slave processor 2 connects with the image buffer 4; i.e., the image data is stored in the image buffer 4. The interrupt routine is finished in step 226.

If the received signal (s2) is not the Receiving-Start-Command, the master processor 1 checks whether or not the slave processor 2 sends a Receiving-Finish-Command to the master processor 1 in step 230. If the slave processor 2 sends the Receiving-Finish-Command, this indicates that the slave processor 2 is in running the receiving ready state in step 232. The interrupt routine is then forwarded to step 224.

If the received signal (s2) is not a Receiving-Finish-Command, the master processor 1 checks whether or not the received signal (s2) is a Transmitting ACK signal in step 240. If the received signal (s2) is not the Transmitting ACK signal, the interrupt routine in this part is forwarded to step 270 and is finished. If the received signal (s2) is the Transmitting ACK signal, the master processor 1 further checks whether or not the first Transmitting ACK signal flag is set in step 250. If the first Transmitting ACK signal flag is set, the master processor 1 switches on the first control switch 10 in step 252, and stores the condensed image data in the image buffer 4 in step 254. The interrupt routine in this part is finished in step 270. If the first Transmitting ACK signal flag is not set, the master processor 1 switches off the first control switch 10 in step 262, and the first Transmitting ACK signal flag thus is cleared in step 264. The interrupt routine is finished in step 270.

Figure 3:
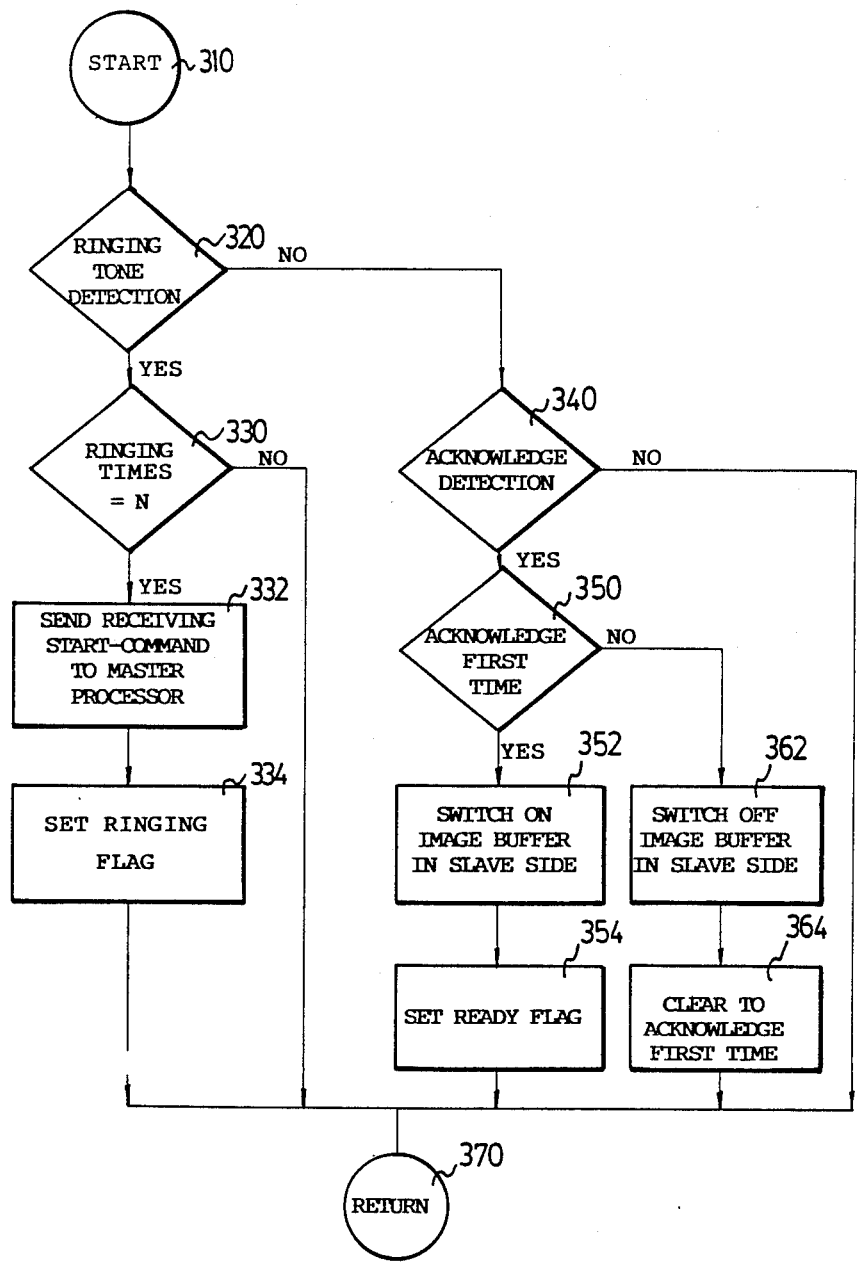
FIG. 3 is a flow chart illustrating the receiving interrupt routine of the slave processor in the fax machine of FIG. 1.

Referring now to FIG. 3, a flow chart for a receiving interrupt routine of the slave processor 2 is shown. The receiving interrupt routine is initialized in step 310. In step 320, the slave processor 2 checks whether or not a ringing-tone signal is received. If the slave processor 2 receives the ringing-tone signals, it checks in step 330 whether or not the number of the ringing-tone signals is equal to N, which can be pre-set. If N ringing-tone signals are received, the slave processor 2 sends a Receiving-Start-Command to the master processor 1 in step 332, and sets a Ringing Flag in step 334. The interrupt routine in the slave processor 2 is finished in step 370. If the number of the ringing-tone signals is not equal to N, the interrupt routine in this part is forwarded to step 370 and is finished.

If the signal (es) received by the slave processor 2 is not the ringing-tone signals, the slave processor 2 checks whether or not it receives the Receiving ACK signal in step 340. If the received signal (s3) is not the Receiving ACK signal, the interrupt routine is forwarded to step 370 and is finished. If the received signal (s3) is the Receiving ACK signal, it checks whether or not the first Receiving ACK signal flag is set in step 350. If the first Receiving ACK signal flag is set, the slave processor 2 switches on the second control switch 20 in step 352. Therefore, the slave processor 2 is connected with the image buffer 4 and can receive the fax image image from the second remote fax machine and store into the image buffer 4. The slave processor 2 thus sets a Ready Flag in step 354 and the interrupt routine is finished in step 370. If the first Receiving ACK signal flag is not set, the slave processor 2 switches off the second control switch 20 in step 362. The first Receiving ACK signal flag thus is cleared in step 364, and the interrupt routine is finished in step 370.

Figure 4:
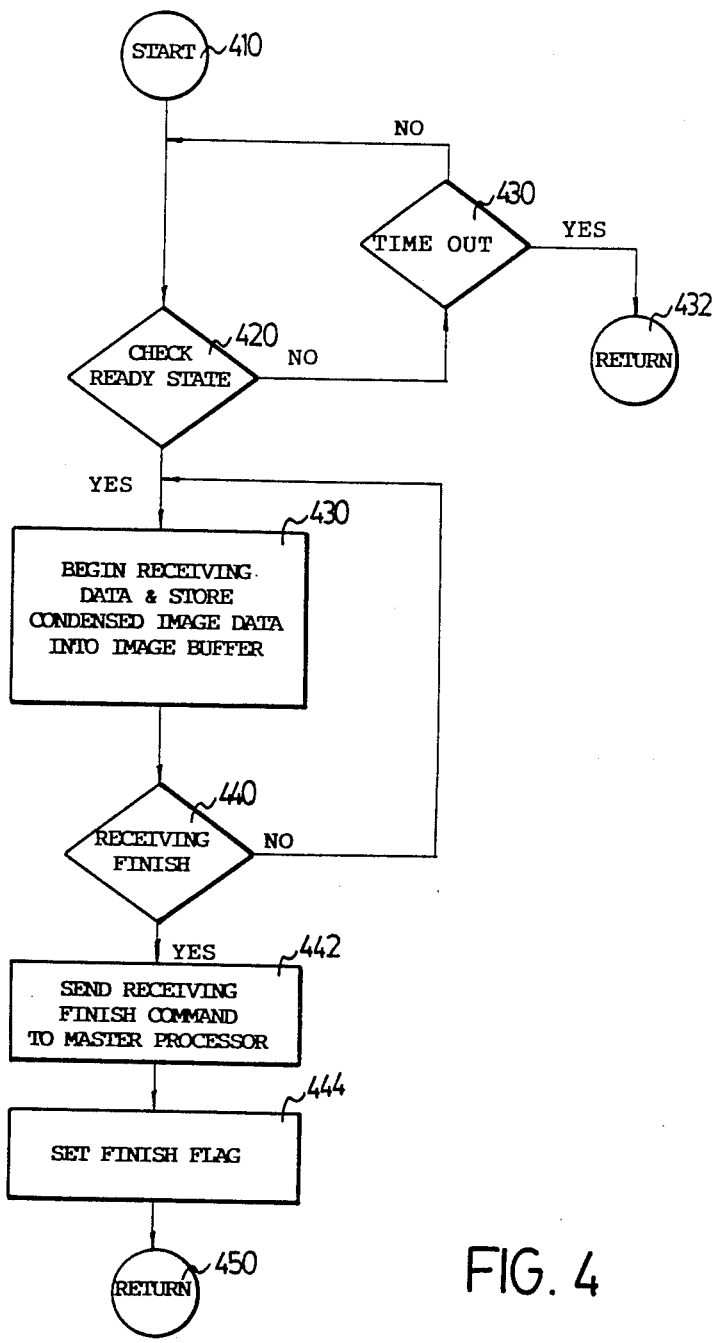
FIG. 4 is a flow chart illustrating the receiving procedure of the slave processor in the fax machine of FIG. 1.

Turning to FIG. 4, a flow chart for the receiving procedure in the slave processor 2 is shown. The receiving procedure is initialized in step 410. In step 420, the slave processor 2 checks itself to determine whether or not it is in ready state to receive a fax image data. If not in ready state, the time flag is checked for whether or not it is time out in step 430. If it is not time out, then the procedure loops back to step 420. If it is time out, the procedure is finished in step 432. If in ready state, the slave processor 2 begins to receive fax image data and store the condensed image data in the image buffer 4 in step 430. Sequentially, the slave processor 2 checks whether or not it finishes receiving the fax image data in step 440. If the slave processor 2 does not finish receiving the fax image data, the procedure loops back to step 430. If the slave processor 2 finishes receiving the fax image data, the slave processor 2 sends a Receiving-Finish-Command to the master processor 1 in step 442. Therefore, the slave processor 2 sets a Finish Flag in step 444, and the procedure is finished in step 450.

Figure 5:
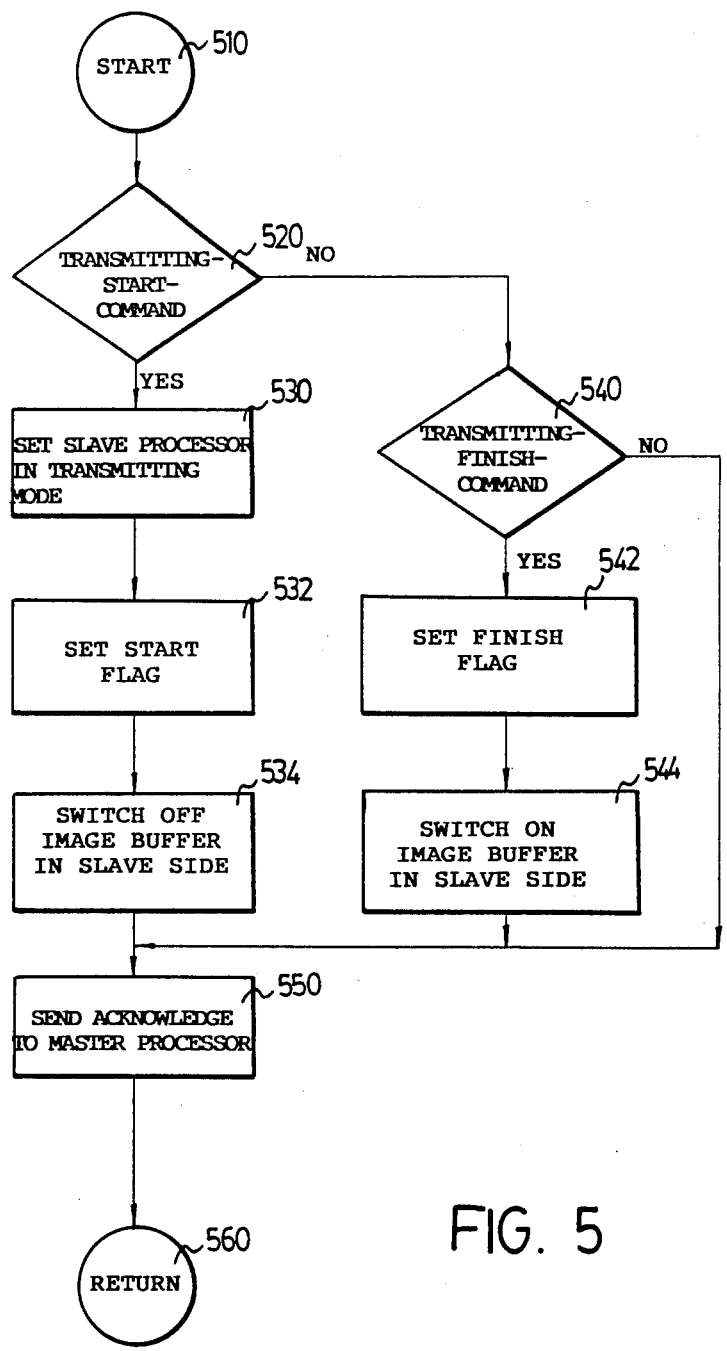
FIG. 5 is a flow chart illustrating the transmitting interrupt routine of the slave processor in the fax machine of FIG. 1.

In FIG. 5, a flow chart for the transmitting interrupt routine in the salve processor 2 is shown. The transmitting interrupt routine is initialized in step 510. In step 520, the slave processor 2 checks whether or not a received signal (s5) from the master processor 1 is a Transmitting-Start-Command. If the slave processor 2 receives the Transmitting-Start-Command, the slave processor 2 is set to the Transmitting Mode in step 530. The slave processor 2 sets a Start Flag in step 532, and switches off the second control switch 20 to disconnect to the image buffer 4 in step 534. After the above-mentioned sequence, the slave processor 2 sends an ACK signal to the master processor 1 in step 550. The interrupt routine is finished in step 560.

If the received signal (s5) is not the Transmitting-Start-Command, the slave processor 2 checks whether or not the received signal (s5) is a Transmitting-Finish-Command in step 540. If, not, the interrupt routine in this part is forwarded to step 550. If receiving the Transmitting-Finish-Command, the slave processor 2 sets a Finish Flag in step 542 and switches on the second control switch 20 to connect to the image buffer 4 in step 544. The interrupt routine is forwarded to step 550. The slave processor 2 sends the second ACK signal to the master processor 1 and is finished in step 560.

Figure 6:
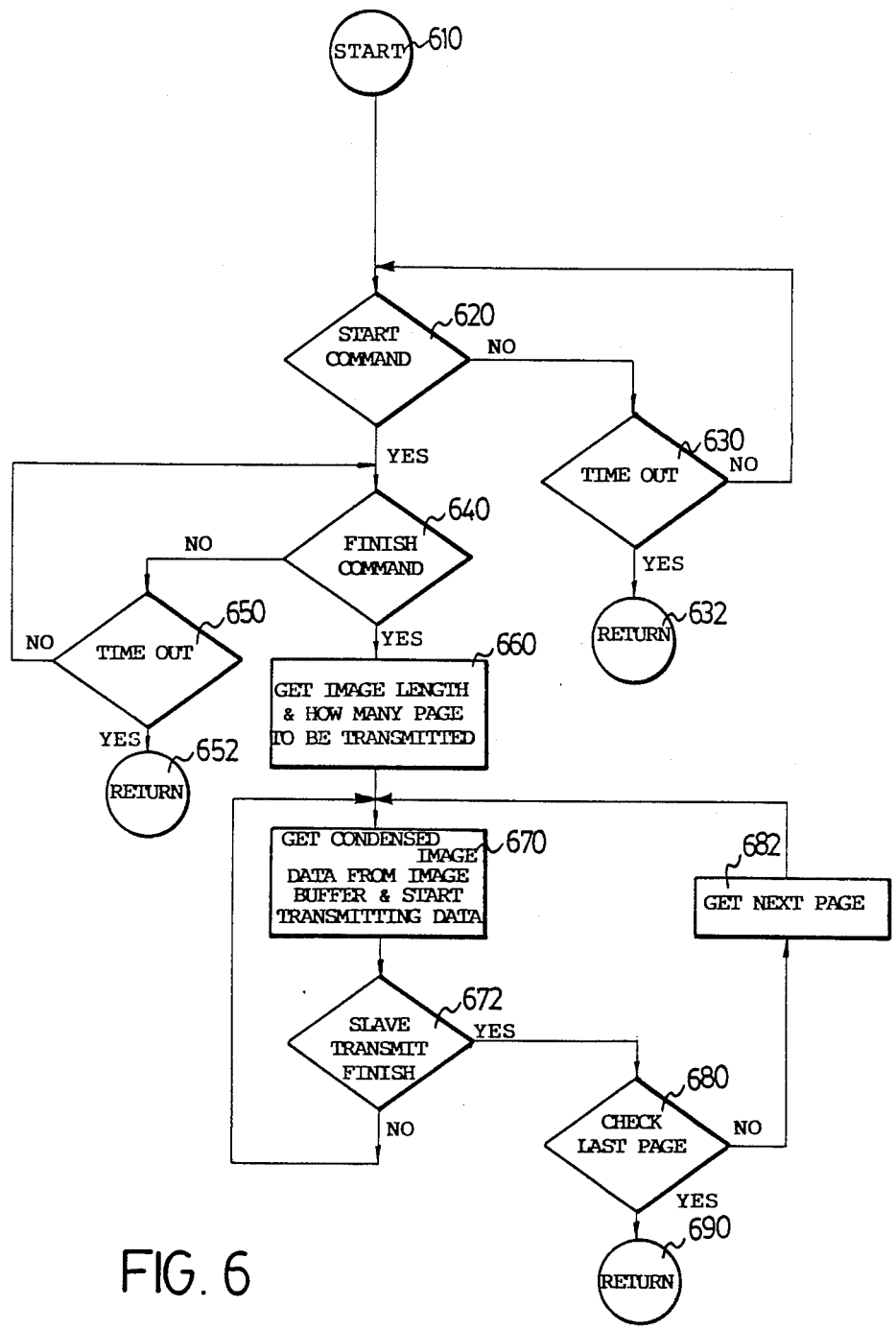
FIG. 6 is a flow chart illustrating the transmitting procedure of the slave processor in the fax machine of FIG. 1.

Turning to FIG. 6, a flow chart for the transmitting procedure in the slave processor 2 is shown. The transmitting procedure is initialized in step 610. In step 620, the slave processor 2 checks whether or not it receives the Start Command signal. If not, the time flag is checked for whether or not it is time out in step 630. If it is not time out, the procedure loops back to step 620 to wait for the master processor 1 to store the condensed image data into the image buffer 4. If it is time out, the procedure is finished in step 632.

After the slave processor 2 receives the Start Command, the master processor 1 begins to store the image data into the image buffer 4. The slave processor 2 further checks whether or not a Finish Command is received in step 640 to assure the finish of the data storage in the image buffer 4 done by the master processor 1. If the slave processor 2 does not receive the Finish Command, the time flag is checked for whether or not it is time out in step 650. If it is not time out, the procedure loops back to step 640. If it is time out, the procedure is finished in step 652.

If the slave processor 2 receives the Finish Command, the slave processor 2 retrieves the image length and the number of the pages already transmitted in step 660. The slave processor 2 further retrieves the condensed image data from the image buffer 4 and starts transmitting the data to the second remote fax machine in step 670. At regular intervals, the slave processor 2 checks whether or not the page transmission is finished in step 672. If the page transmission is not finished, the procedure loops back to step 670. If the page transmission is finished, the page number is checked for whether or not it is the last page number in step 680. If the page number is not the last page number, the procedure loops back to step 670 via step 682 to retrieve the next page number. If the page number is the last page number, the procedure is finished in step 690.

While the invention has been explained in relation to its preferred embodiments, it is to be understood that various modifications thereof will become apparent to those skilled in the art upon reading this specification. Therefore, it is to be understood that the invention disclosed herein is intended to cover such modifications as fall within the scope of the appended claims.

I claim:

1. A fax machine equipped for simultaneous transmission and reception via two telephone lines, comprising a master processor connected to a first telephone interface adapter and a first telephone line for communicating with a first remote fax machine, a printer connected to said master processor for printing image data received from said first remote fax machine, and a scanner for scanning image data to be transmitted to said first remote fax machine, characterized in that said fax machine further comprises:

a slave processor connected to a second telephone interface adapter and a second telephone line for communicating with a second remote fax machine;

a command buffer electrically interposed between said master and said slave processor, and providing a transmission channel for command signals therebetween;

an image buffer connected to said master processor via a first control switch and to said slave processor via a second control switch to store said image data at the request of said master processor when transmitting said image data to said second remote fax machine and to store said image data at the request of said slave processor when receiving said image data from said second remote fax machine;

said slave process switching off said second control switch and said master processor switching on said first control switch so that said master processor stores said image data into said image buffer when said slave processor is requested to transmit image data from said scanner to said second remote fax machine; said master processor switching off said first control switch after having stored said image data into said image buffer and said slave processor switching on said second control switch to transmit said image data to said second remote fax machine; and said master processor switching off said first control switch and said slave processor switching on said second control switch to store said image data into said image buffer when said slave processor receives said image data; said slave processor switching off said second control switch after finishing receipt of said image data and said master processor switching on said first control switch and outputting said image data via said printer.

2. A fax machine as set forth in claim 1, wherein a broadcasting image buffer is provided connected to said master processor to facilitate said transmission of said image data without re-scanning said image data.

* * * * *